United States Patent [19]
Miura et al.

[11] Patent Number: 5,696,989
[45] Date of Patent: Dec. 9, 1997

[54] MICROCOMPUTER EQUIPPED WITH DMA CONTROLLER ALLOWED TO CONTINUE TO PERFORM DATA TRANSFER OPERATIONS EVEN AFTER COMPLETION OF A CURRENT DATA TRANSFER OPERATION

[75] Inventors: Katsumi Miura; Yuko Mitsuhira, both of Tokyo, Japan

[73] Assignee: NEC Corporation, Tokyo, Japan

[21] Appl. No.: 720,288

[22] Filed: Jun. 25, 1991

[30] Foreign Application Priority Data

Jun. 25, 1990 [JP] Japan ................................. 2-165915
Sep. 7, 1990 [JP] Japan ................................. 2-237416

[51] Int. Cl.$^6$ ........................................ G06F 13/12
[52] U.S. Cl. ........................................... 395/844
[58] Field of Search ............................. 395/375, 425

[56] References Cited

U.S. PATENT DOCUMENTS

| | | | |
|---|---|---|---|
| 4,475,155 | 10/1984 | Oishi et al. ............................... | 395/275 |
| 4,847,750 | 7/1989 | Daniel ....................................... | 395/425 |
| 5,056,011 | 10/1991 | Yoshitake et al. ....................... | 395/425 |

FOREIGN PATENT DOCUMENTS

| | | |
|---|---|---|
| A0153764 | 4/1985 | European Pat. Off. . |
| A0333594 | 9/1989 | European Pat. Off. . |

OTHER PUBLICATIONS

Intel, "iAPX 86/88, 186/188 User's Manual, Hardware Reference," 1985, pp. 4–1 to 4–40.
Patent Abstracts of Japan, vol. 13, No. 253, Jun. 13, 1989 & JP-A-10 50 154, Feb. 27, 1989.
Patent Abstracts of Japan, vol. 12, No. 238, Jul. 7, 1988 & JP-A-63 029 868, Feb. 8, 1988.
Patent Abstracts of Japan, vol. 5, No. 1818, Jul. 30, 1981 & JP-A-56 060 933, May 26, 1981.

*Primary Examiner*—Richard L. Ellis
*Attorney, Agent, or Firm*—Sughrue,Mion,Zinn,Macpeak & Seas, PLLC

[57] ABSTRACT

A microprocessor with a DMA controller for performing data transfers between a peripheral unit and a memory in response to a transfer request from the peripheral unit. The DMA controller includes a first memory block for storing information necessary to perform a current DMA data transfer and a second memory block for storing information necessary to perform the next DMA data transfer. The second DMA data transfer is initiated after completion of the first data transfer and the information stored in the second memory block is transferred to the first memory block. This process is repeated for all subsequent DMA data transfers. Each section of information stored in the first and second memory blocks includes the number of data transfers to be performed, a memory access address representing the location of the data to be transferred, and control/status information. The control/status information includes enable/disable information indicated whether another block of data is to be transferred via the DMA data transfer, thereby shortening the duration of a data transfer inhibiting state.

5 Claims, 7 Drawing Sheets

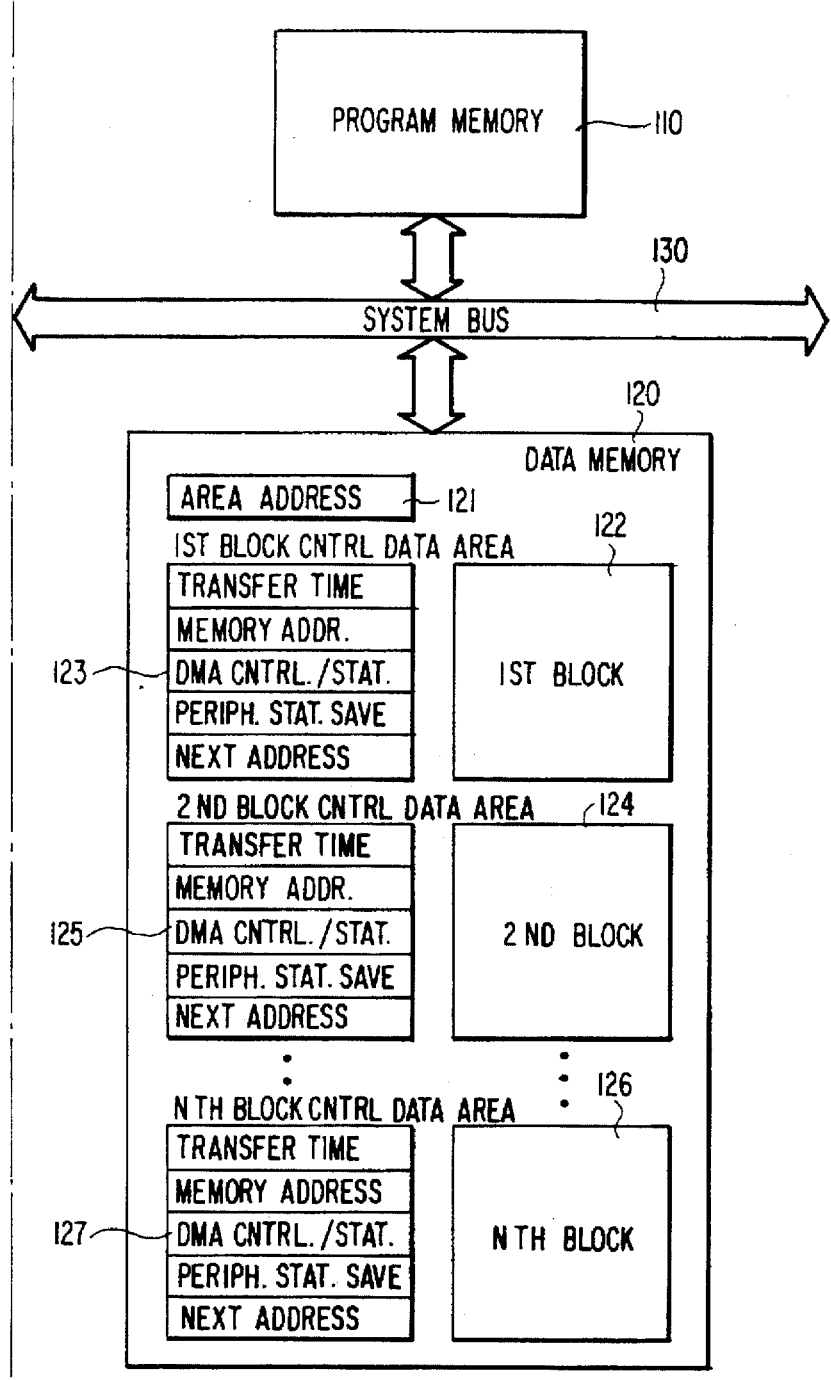

MICROCOMPUTER EQUIPPED WITH DMA CONTROLLER ALLOWED TO CONTINUE TO PERFORM DATA TRANSFER OPERATIONS EVEN AFTER COMPLETION OF A CURRENT DATA TRANSFER OPERATION

BACKGROUND OF THE INVENTION

The present invention relates to a microcomputer (or microprocessor) and, more particularly, to a microcomputer equipped with a direct memory access (DMA) controller.

In order to comply with demands for high performance and high speed, a recent microcomputer has been equipped with various peripheral units such as an interrupt controller, a timer, a counter and a serial data communication unit. In such a microcomputer, if data transfer between some peripheral unit and a memory is performed by a central processing unit (CPU) with intervention of software (program), data processing efficiency is lowered as well known in the art. Therefore, the data transfer between the peripheral unit and the memory is generally performed by a DMA controller in place of CPU.

The DMA controller includes an address register for storing address information of a memory to be accessed, a terminal counter register for storing the number of data to be transferred and a control register for storing control information such as a data transfer direction and an address updating direction. These registers are initially set with necessary data or information by CPU. When the DMA controller receives a data transfer request from the peripheral unit, it obtains a bus control right from CPU to thereby perform the data transfer between the peripheral unit and the memory. After data transfer, the DMA controller returns the bus control right to CPU and then shifts into a condition of waiting for a subsequent data transfer request. When the number of data thus transferred reaches the number set into the terminal counter register, the DMA controller is brought into a data transfer inhibiting state with issuing an interrupt request to CPU. In response thereto, CPU executes an interrupt processing routine to set again necessary information into the respective registers. The DMA controller is thereby brought again into a data transfer permitting state.

During the data transfer inhibiting state of the DMA controller, the peripheral unit often generate a data transfer request. In this case, that request is not of course accepted, but shelved. While a time period during which the DMA is in the data transfer inhibiting state depends on the priority order to the interrupt request from the DMA controller and/or the number of transfer channels supported by the controller, if the data transfer inhibiting state is prolonged, the peripheral unit may take a condition that it generates a next data transfer request before the previous data transfer request is accepted. For example, a serial data receiving unit as the peripheral unit generates a data transfer request each time it receives a predetermined number of bit data, so that the receipt of next data may be completed before the previous data is transferred to the memory. In such a case, the previous data is destroyed, resulting in the occurrence of a receiving over-run error. In a serial data transmitting unit as another example of the peripheral unit, data to be next transmitted is not supplied thereto in spite of transmission of the previous data being completed, so that a transmitting under-run error occurs. Such errors become easy to occur, the faster transmission speed on a serial circuit becomes. Even if receiving/transmitting data buffer stages increased in number, error occurs when the data transfer requests are shelved more than the increased number. Moreover, increasing the number of data buffers to balance with a high speed serial circuit enlarges hardware of a microcomputer.

SUMMARY OF THE INVENTION

Therefore, an object of the present invention is to provide a microcomputer equipped with a DMA controller in which a time period of a data transfer inhibiting state can be shortened remarkably.

Another object of the present invention is to provide a microcomputer having a DMA controller which can prevent occurrence of an error in a peripheral unit due to shelver of data transfer requests.

Still another object of the present invention is to provide a microcomputer equipped with a DMA controller for supporting a serial data communication unit for a high speed serial circuit.

A microcomputer according to the present invention has a CPU and a DMA controller for performing data transfer between a peripheral unit and a memory in response to a data transfer request from the peripheral unit. The DMA controller includes a first storage for storing shift information necessary to perform a current data transfer operation, a second storage for storing second information necessary for a next data transfer operation to be initiated after completion of the current data transfer operation, an execution device for performing the data transfer in response to the data transfer request by use of the first information, and a device for causing the execution device to perform the data transfer by use of the second information and for generating an interrupt request to the CPU when the number of transferred data reaches the number of data to be transferred by use of the first information, so that the execution device performs the data transfer in response to a subsequent data transfer request by use of the second information.

Thus, when the current data transfer operation is completed due to the number of transferred data reaching a predetermined number, the execution device is immediately brought into a data transfer permitting state using the second information. The data transfer between the peripheral unit and the memory can be thereby performed sequentially without the data transfer request being shelved.

On the other hand, the CPU suspends program execution in response to the interrupt request from the DMA controller and then supplies the DMA controller with third information necessary for a further next data transfer operation to be initiated after completion of the next data transfer operation. Accordingly, when the next data transfer operation is completed, the DMA controller is also brought immediately into the data transfer permitting state using the third information.

BRIEF DESCRIPTION OF THE DRAWINGS

The above and other objects, advantages and features of the present invention will be more apparent from the following description taken in conjunction with the accompanying drawings, in which:

FIG. 1, 1a, 1b is a block diagram representative of a system employing a microcomputer according to a first embodiment of the present invention;

DETAILED DESCRIPTION OF THE INVENTION

Figure 1A:
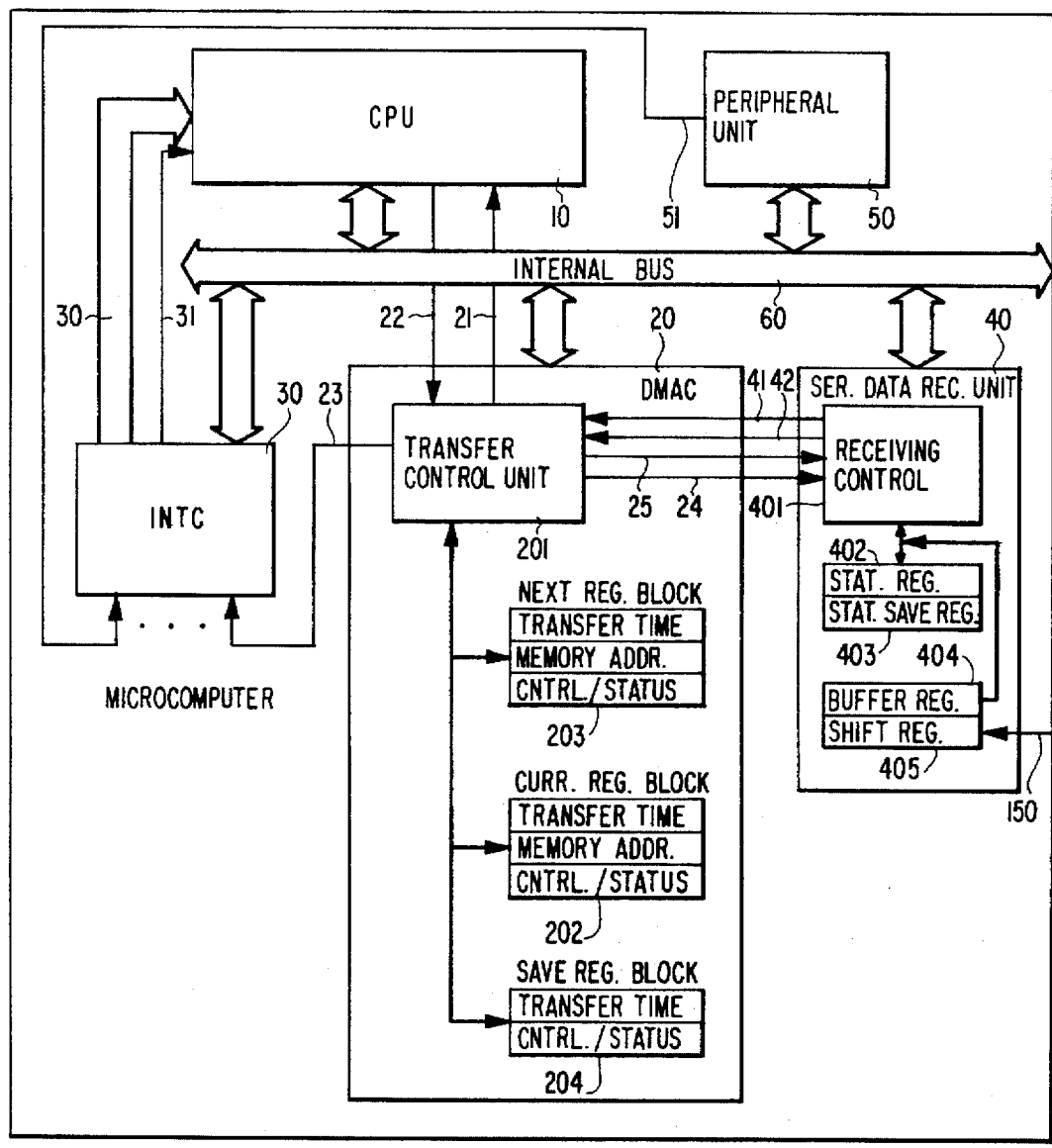
Figure 1:
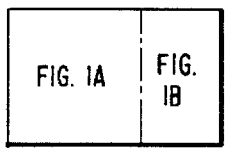

Referring now to FIG. 1, a microcomputer system includes a microcomputer 100 according to a first embodiment of the present invention, a program memory 110 and a data memory 120 which are interconnected to one another via a system bus 130. The microcomputer 100 includes CPU 10 and, as peripheral units, a DMA controller (DMAC) 20, an interrupt controller (INTC) 30, a serial data receiving unit 40 and another unit 50 such as a timer and a counter. These units are fabricated on a single semiconductor chip and interconnected via an internal bus 60. The program memory 110 stores a string of instructions for program.

CPU 10 fetches and executes each instruction from the program memory 110 to process operand data. The operand data to be processed and the processed data are stored in the data memory 120.

INTC 30 receives a plurality of interrupt request signals containing a signal 23 from DMAC 20 and a signal 51 from the peripheral unit 50. When two or more interrupt requests are generated simultaneously, INTC 30 selects one of them in accordance with a predetermined priority order and then supplies an interrupt processing request signal 31 to CPU 10 together with an interrupt vector number 32. In response thereto, CPU 10 suspends program execution and then shifts to execution of an interrupt processing routine after saving the contents of a program counter, a program status word and a set of general purpose registers (all not shown).

The serial data receiving unit 40 receives data supplied in serial through a serial circuit 150. The serial data are fetched in a shift register 405 in order. When predetermined bits of data, 8-bit for example, are received, those data are passed in parallel from the shift register 405 to a buffer register 404. The shift register 405 then receives next serial data. When the data is passed to the buffer register 404, a receiving control unit 401 changes a DMA data transfer request signal 42 to an active level to request DMAC 20 for data transfer. In the case where the data in the buffer register 404 is an EOF (End Of Frame) code indicative of completion of one frame data transmission, a block switching signal 41 is made active to request DMAC 20 for changing the memory block. Accordingly, one of the signals 41 and 42 is generated and supplied to DMAC 20 each time predetermined bits of serial data are received. The receipt of the EOF code and the error occurrence in the received data are recorded in a status register 402. The output of the buffer register 404 is outputted onto the internal bus 60 by the control unit 401 in synchronism with a data output command signal 25 from DMAC 20. Further supplied from DMAC 20 is a status save command signal 24. In response to this signal 24, the content of the status register 402 is saved into a status save register 403.

DMAC 20 includes a transfer control unit 201 performing data transfer between the receiving unit 40 and the data memory 120 based upon control information stored in a current register block 202. The information stored in the register block 202 includes transfer time information representing the number of times of data transfer to be performed, memory address information representing an access address to the memory 120 and control/status information, as shown in the drawing. The control/status information contains transfer direction information indicating a direction of data transfer from a memory to a peripheral unit or from a peripheral unit to a memory (in the present embodiment, the directin from the unit 40 to the memory 120 being designated), address update control information indicating an updating direction of the memory address, and transfer-enable information representing whether or not the data transfer request is accepted. Further contained in the control/status information is continuous transfer enable/disable information representing whether continuous data transfer to another memory block is enabled or disabled. DMAC 20 further includes a next register block 203 and a save register block 204 in accordance with the present invention. The next register block 203 stores information necessary for a next data transfer operation to be performed after completion of a current data transfer operation, i.e., next transfer time information, next memory address information and next control/status information, as shown in the drawing. The save register block 204 saves the transfer time information and the control/status information of the current register block 202. The transfer control unit 201 supplies a hold request (HLDRQ) signal 21 to CPU 10 in order to get a usage right of the buses 60 and 130 from CPU 10. In response thereto, CPU 10 returns a hold acknowledge (HLDACK) signal 22 to give the bus usage right. The data transfer from the unit 40 to the memory 120 is thereby performed. Each time the data transfer is performed, the number of transfer times stored in the current register block 202 is decremented by one and the memory address is updated. When the number of transfer times becomes zero, i.e. when the number of data transfers reaches the number designated in the current data transfer operation, the transfer time information and the control/status information of the current register block 202 are saved to the save register block 204. This saving operation is also carried out when the block switching signal 41 is generated by the unit 40. When the saved control/status information contains the continuous transfer enable information, the contents of the next register block 203 are copied into the current register block 202. The interrupt request signal 23 and the status save command signal 24 are thereafter generated. On the other hand, when the saved control/status information contains the continuous transfer disable information, the signals 23 and 24 are generated without the contents of the register block 203 being copied into the register block 202.

In the data memory 120, 1st to Nth blocks 122, 124, ..., 126 are prepared as a storage area to be transferred with data from the serial data receiving unit 40. The data memory 120 further includes 1st to Nth block control data areas 123, 125, ..., 127 provided correspondingly to the blocks 122, 124, ..., 126. Each of the block control data areas stores transfer time data indicating the size of the corresponding block (i.e., the number of transfer times to be performed), memory address data indicating the leading address of the corresponding block, DMA control/status data for the data transfer between the corresponding block and the unit 40, peripheral status save data written with the content of the status save register 403, and next address data indicating the leading address of another block control data area, as shown in the drawing. Further provided in the data memory 120 is an area 121 for storing a control data area address.

Next, an operation will be described in detail with reference to FIGS. 1 to 3.

CPU 10 performs an initializing operation before activating DMAC 20. More specifically, 1st to Nth blocks 122, 124, . . . , 126 are allocated and the above-mentioned data are written into the respective block control data areas 123, 125, . . . , 127. In this description, each DMA control/status data of 1st to (N−1)th block control data area contains the continuous transfer enable information, whereas that of Nth block control data area contains the continuous transfer disable information. Moreover, the next address data of Ith (I=1, 2, . . . , N−1) block control data area indicates the leading address of (I+1)th block control data area. The control data area 121 is set with the leading address of 1st block control data area 123. CPU 40 further sets the serial data receiving unit 40 with receiving control information such as speed information of the serial circuit 150 to initiate a serial receiving operation. Furthermore, the transfer number information, memory address information and DMA control/status information stored in 2nd block control data area 125 are loaded into the next register block 203 of DMAC 20, and the transfer number information, memory address information and DMA control/status information stored in 1st block control data area 123 are loaded into the current register block 202. DMAC 20 is thus activated. CPU 10 continues to fetch and execute subsequent instructions from the program memory 110.

Figure 2:
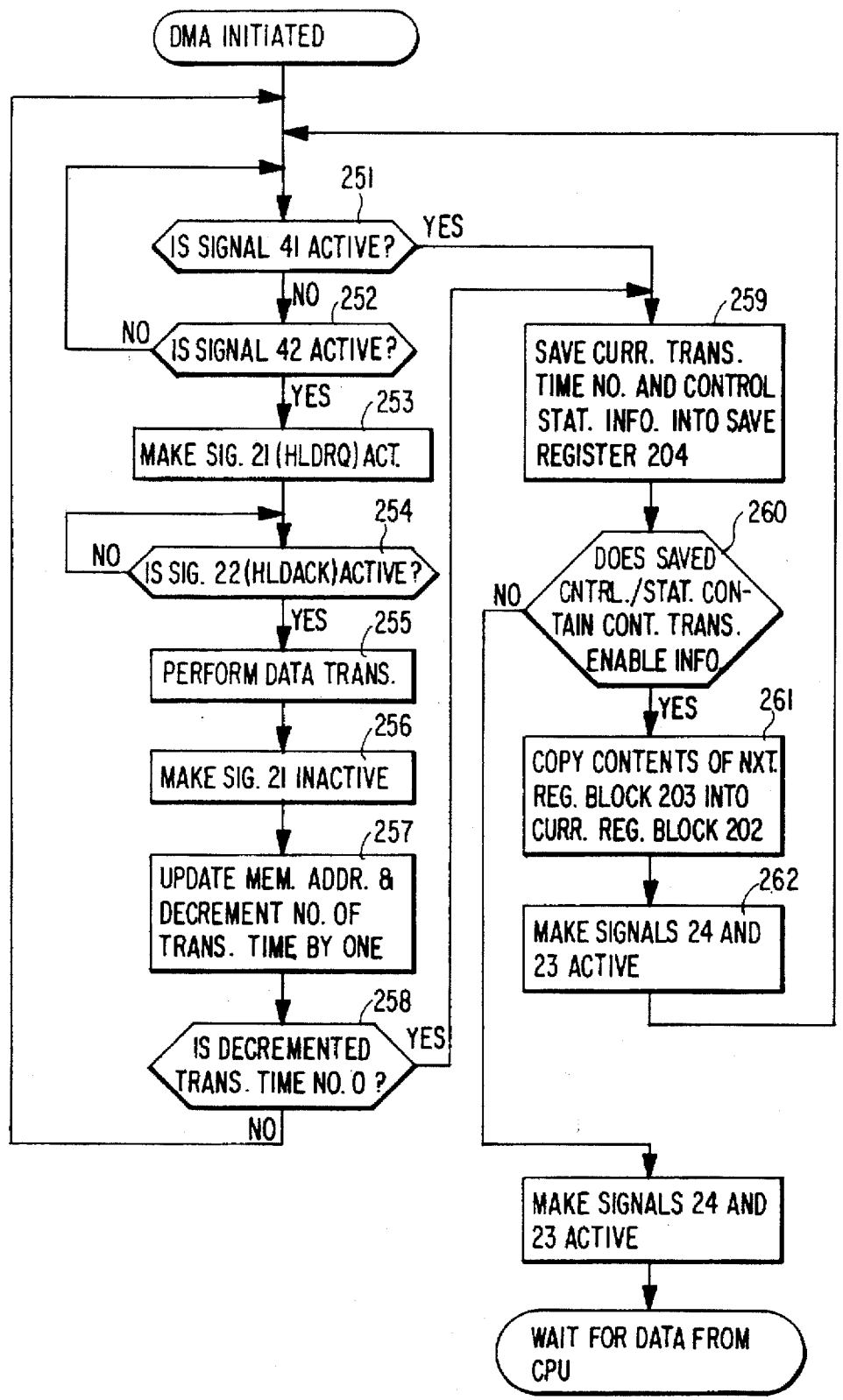
FIG. 2 is a flow chart representative of an operation of a DMA controller shown in FIG. 1.

On the other hand, DMAC 20 thus activated operates in accordance with a flow chart shown in FIG. 2. More specifically, it is judged whether or not the block switching request signal 41 is active (251) and whether or not the data transfer request signal 42 is active (252).

The serial data receiving unit 40 is also in the activated condition and thus receiving the serial data from the serial circuit 150. When the predetermined bits of serial data are received, it is judged whether that data is EOF code or normal data to generate the signals 41 or 42.

Assuming that the receiving unit 40 generates the data transfer request signal 42, the transfer control unit 201 changes the HLDRQ signal 21 to the active level to request the bus control right from CPU 10 (253). In response thereto, CPU 10 suspends the program execution and then returns the HLDACK signal 22 with bringing the internal circuit thereof into a hold state. When the transfer control unit 201 detects the active level HLDACK signal 22 (254), it supplies the memory address stored in the current register block 202 to the data memory 120 via the buses 60 and 130 and further generates the data output command signal 25 to cause the unit 40 to output the received data onto the buses 60 and 130. Thus, the received data is transferred to the leading address location of 1st block 122 in the memory 120 (255). After data transfer, the HLDRQ signal 21 is withdrawn to return the bus control right to CPU 10 (256). Thus, CPU 10 resumes the suspended program execution. Thereafter, the transfer control unit 201 updates the memory address and then restores the updated memory address into the current register block 202. Further, the number of transfer times indicated by the transfer number information is decremented by one, the decremented number being in turn restored into the current register block 202 (257). If desired, the memory address may be updated before the data transfer and the updated memory address may be used for the data transfer. The transfer control unit 201 judges whether or not the decremented number is zero (258), and, if not, returns to step 251. The above operation is executed each time the data transfer request signal 42 becomes active.

When the block switching request signal 41 is generated or when the content of the transfer number information becomes zero to indicate that 1st block 122 is filled with the transferred data, the operation of DMAC 20 shifts into step 259 in which the transfer number information and the control/status information in the current register block 202 are saved into the save register block 204. The transfer control unit 201 then judges whether or not the saved control/status information contains the continuous transfer enable information (260). In the present description, since the continuous transfer enable information is contained, the step 261 is performed so that the contents of the next register block 203 are copied into the current register block 202. Thus, DMAC 20 is brought immediately into a transfer permitting state for performing data transfer between the serial data receiving unit 40 and 2nd block 124 of the memory 120 without waiting for the data setting operation by CPU 10. The transfer control unit 201 thereafter generates the peripheral save command signal 24 and the interrupt request signal 23 and then shifts the operation thereof to step 251. Accordingly, when the serial data receiving unit 40 thereafter generates the data transfer request 24, the received data is transferred to 2nd block 124.

On the other hand, in response to the peripheral save command signal 24, the receiving control unit 401 saves the content of the status register 402 into the status save register 403.

INTC 30 responds to the interrupt request signal 23 from DMAC 20 to generate an interrupt processing request to CPU 10. In response thereto, CPU 10 suspends the program execution, thereafter saves information necessary to resume the suspended program execution into a stack area (not shown) in the data memory 120, and then executes an interrupt processing routine shown in FIG. 3.

In this interrupt processing routine, CPU 10 first reads out the saved status information from the status save register 132 of the receiving unit 40 to check whether or not any error has occurred in the received data and/or the receiving condition (302). If error is detected, CPU 10 executes an error processing operation 303 to stop the operations of DMAC 20 and the receiving unit 40 and request a serial data transmitting device (not shown) to transmit again serial data with reinitializing DMAC 20 and the unit 40. If no error is detected, CPU 10 loads the content of the status save register 403 into 1st block control data area 123 as peripheral status save data and the contents of the save register block 204 into the same area 123 as the transfer number data and DMA control/status data (304). For this processing operation, the respective addresses of 1st block control data area 123 are obtained from the leading address of the area 123 stored in the control data address area 121 and predetermined offset values allotted to the respective locations in the block control data area. The addresses of the respective registers in DMAC 20 and the receiving unit 40 are previously determined as I/O addresses. Thereafter, the content of the next address data in 1st block control data area 123, i.e. the leading address of 2nd block control data area 125, is loaded into the control data address area 121. CPU 10 then judges whether or not the saved DMA control/status information in the area 123 contains the continuous transfer enable information (305). In the present description, since that information is contained, the transfer number information, memory address information and DMA control/status date in 3rd block control data area (not shown) are loaded into the next register block 203 of DMAC 20 by using the content of the control data area address 121 and the next address data in 2nd block control data area 125 (306).

Turning back to FIG. 2, when the saved control/status information contains the continuous transfer disable information in step 260, the transfer control unit 201 generates the signals 23 and 24 without copying the contents of the next register block 203 into the current register block 202.

DMAC 20 is thereby brought into a data transfer inhibiting state and waits for the data setting operation by CPU 10. In the interrupt processing routine of CPU 10 shown in FIG. 3, therefore, step 307 is executed after step 305 to the desired data stored in 2nd and 3rd block control data area are loaded into the current and next register blocks 202 and 203, respectively. DMAC 20 is thereby activated again.

After step 306 or 307, CPU 10 performs a processing operation on data stored in 1st block 122. Thereafter, the information saved in the data memory 120 are returned to CPU 10, so that the suspended program execution is resumed.

Since the saved transfer number information in the save register block 204 is loaded to the corresponding block control data area, even when the above-mentioned block switching operation is executed in response to the request signal 41 generated due to the receipt of EOF code, it can the amount of valid data stored in the corresponding block.

As described above, by setting the continuous transfer enable information into DMA control/status information, DMAC 20 is brought immediately into the data transfer permitting state for a next block, so that the serial data receiving unit 40 is free from the receiving over-run error.

The microcomputer 100 can be equipped with a serial data transmitting unit. In this case, a set of current register block, next register block and save register block is further provided in DMAC 20 and the data transfer operations for the receiving and transmitting units are performed in a time-sharing manner. Both of the receiving over-run error and the transmitting under-run error are prevented from occurring.

Figure 4:
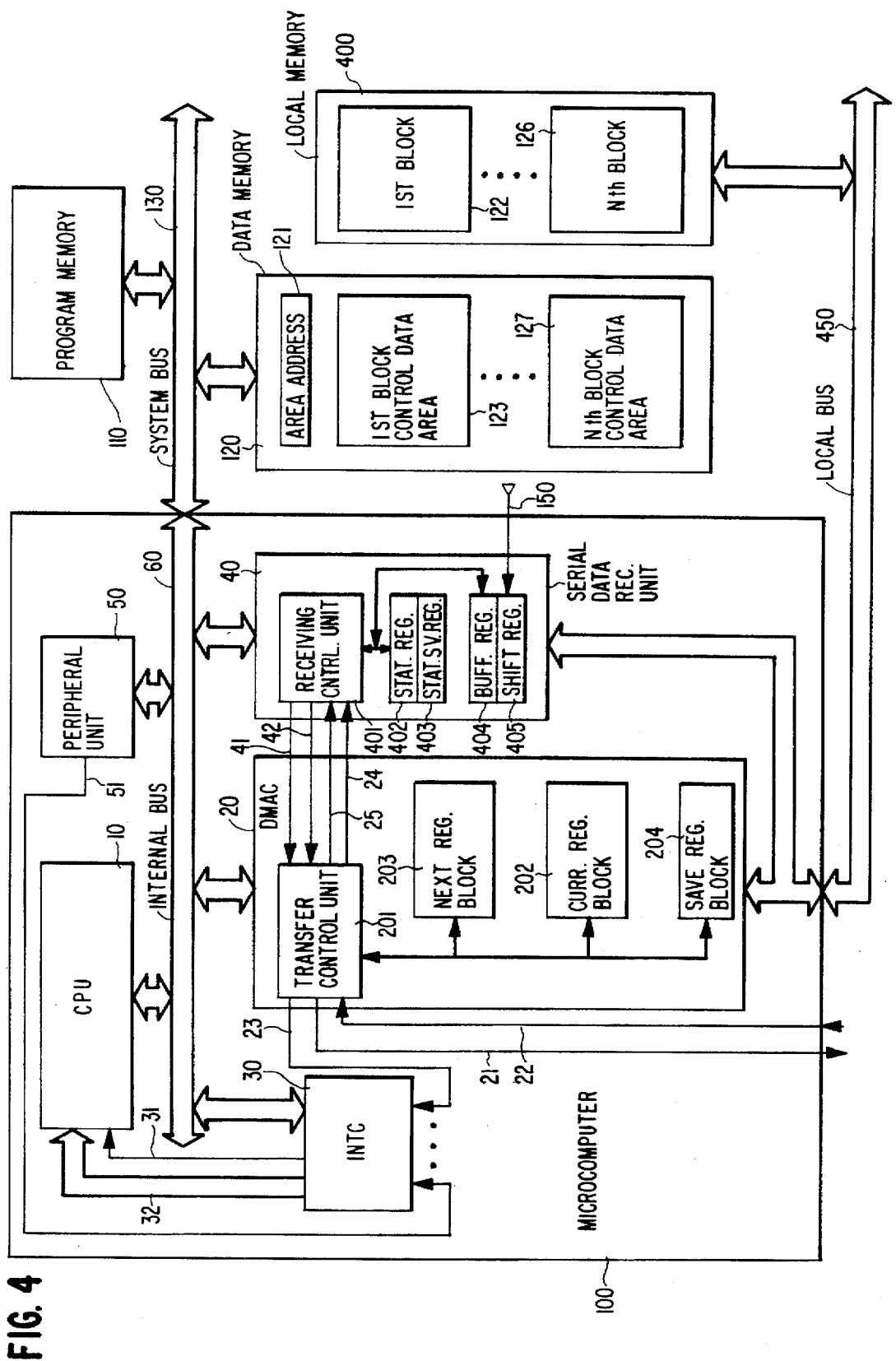
FIG. 4 is a system block diagram representative of a second embodiment according to the present invention.

Turning to FIG. 4, there is shown a microcomputer 101 according to a second embodiment of the present invention, in which the same constituents as those shown in FIG. 1 are denoted by the same reference numerals to omit further description thereof. This microcomputer 101 includes DMAC 20 for performing data transfer between the serial data receiving unit 40 and a local memory 400. DMAC 20, the receiving unit 40 and the local memory 400 are interconnected to one another via a local bus 450. When the receiving unit 40 issues a data transfer request, the transfer control unit 201 obtains the bus control right of the local bus 450 from a processor (not shown) managing the bus 450 by use of HLDRQ signal 21 and HLDACK signal 22. The data is thereby transferred from the receiving unit 40 to the local memory 400.

According to this embodiment, the main and interrupt program routines executed by CPU 10 are not suspended, and therefore the program execution efficiency is enhanced. The local bus 450 may be used only as a DMA transfer bus, and in that case the signals 21 and 22 can be omitted.

Figure 3:
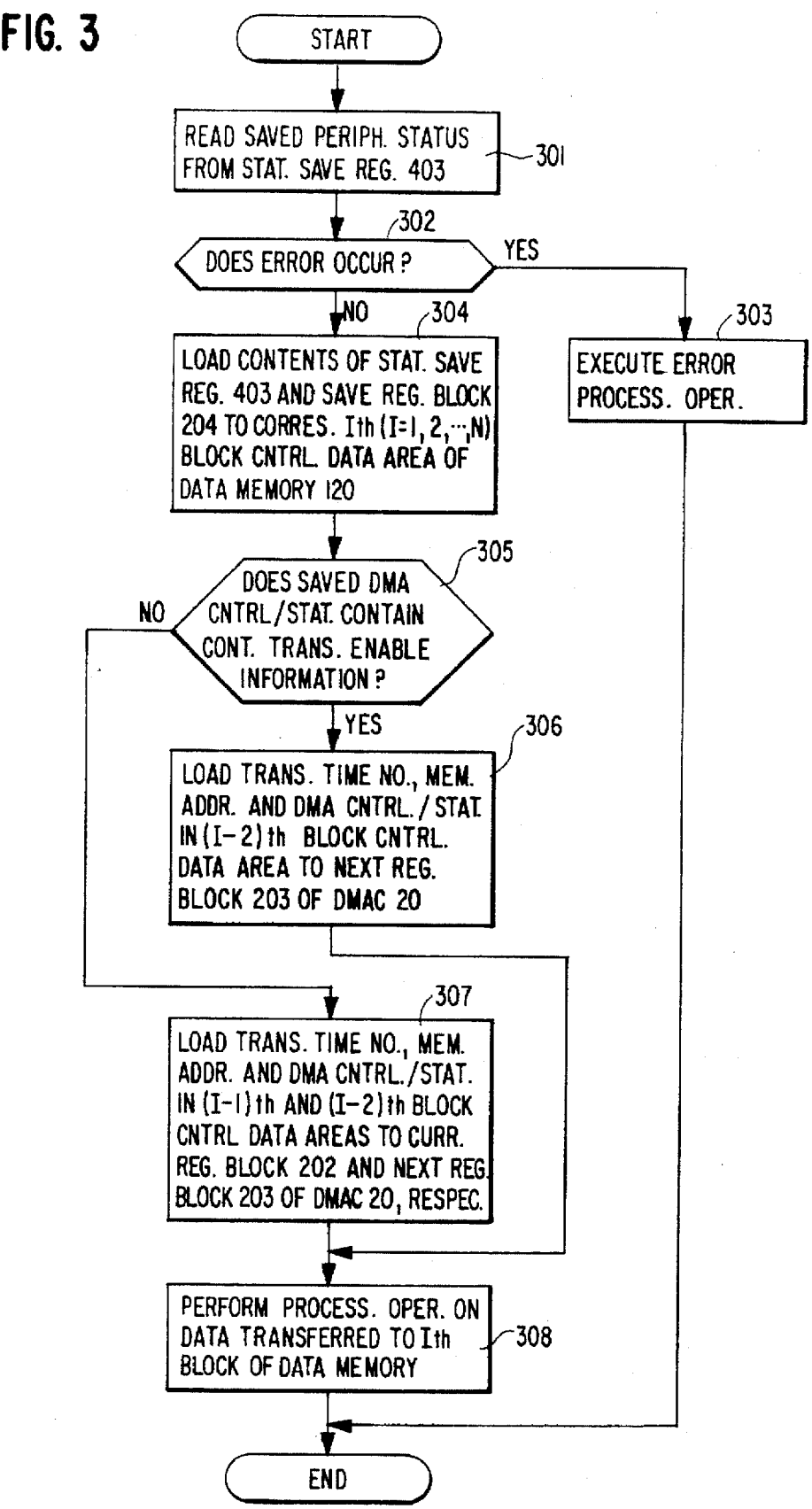
FIG. 3 is a flow chart representative of an example of an interrupt processing routine executed by CPU shown in FIG. 1.

In the above embodiments, the interrupt program routine shown in FIG. 3 is made by a user and thus can be changed. For example, the error check step 302 and/or the data processing operation 308 can be executed after all the blocks 122, 124, . . . , 126 are transferred with received data.

As described hereinbefore, CPU 10 must save the internal execution states thereof into the data memory 120 in order to initiate the interrupt program routine shown in FIG. 3, and after execution of the interrupt program routine it must return the saved states in order to resume the suspended program execution. This saving and returning operation is called "overhead". If such overhead can be removed and if CPU can perform as hardware thereof regular operations responsive to the interrupt request from DMAC 20 without using instructions stored in the program memory 10, the program execution efficiency of CPU would be further enhanced and the burden of making a program by a user would be reduced.

Figure 5:
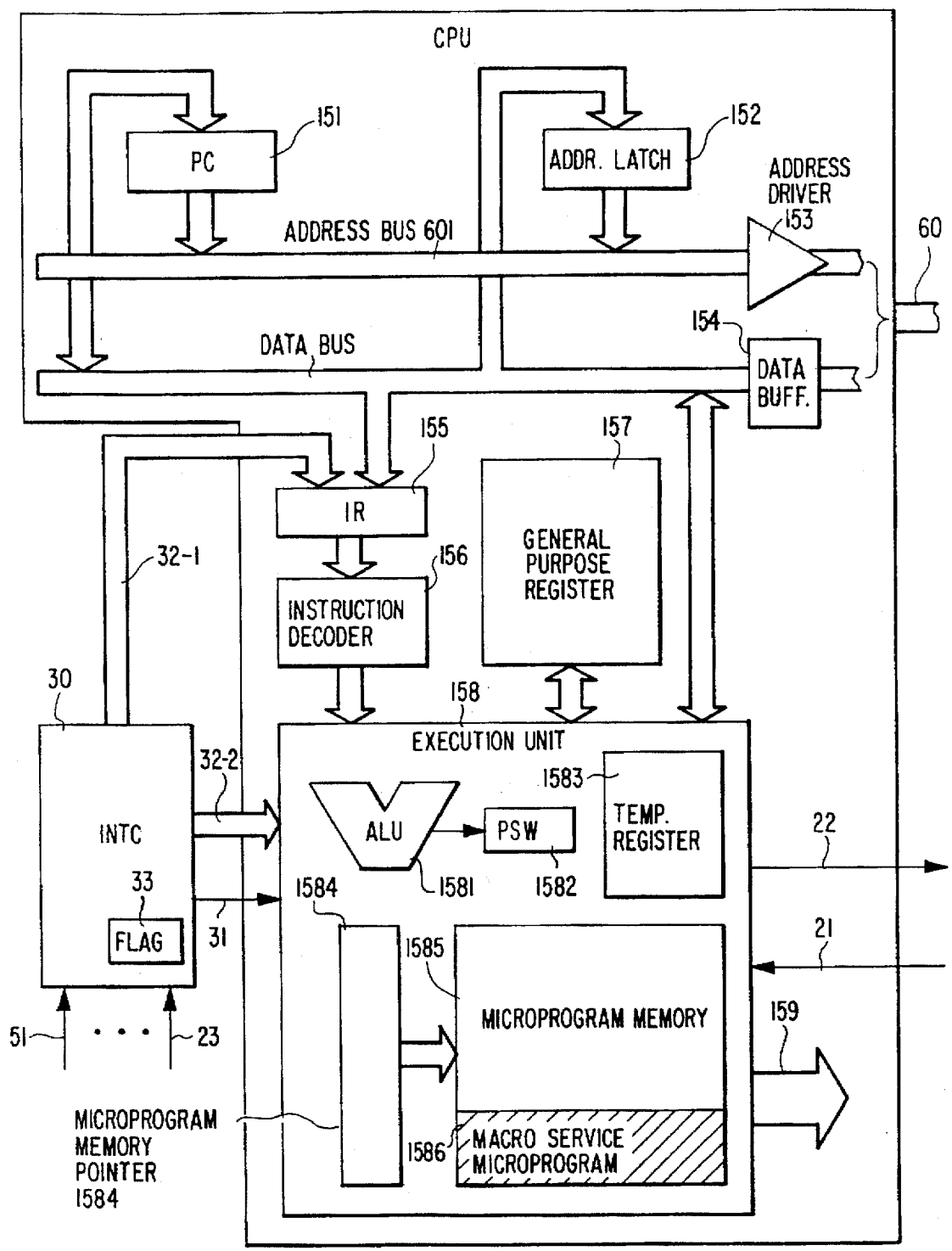
FIG. 5 is a block diagram representative of CPU of a microcomputer according to a third embodiment of the present invention.

A construction for that purpose are shown in FIG. 5 as a third embodiment of the present invention. Note that only CPU 15 and INTC 30 are shown in the drawing since the other construction is the same as that shown in FIG. 1. This CPU 15 operates in a microprogram control manner. That is, the function designated by each instruction stored in the program memory 10 is achieved by executing a string of microinstructions (i.e., microprogram) corresponding thereto. Since the microprogram is masked and thus cannot be accessed by a user, it is regarded as a part of hardware of the microcomputer.

The content of a program counter (PC) 151 is transferred onto the buses 60 and 130 via an address bus 601 and an address driver 153 to access the program memory 110. The instruction read out of the program memory 110 is temporarily stored in an instruction register (IR) 155 through a data buffer 154 and a data bus 602. The instruction from IR 155 is decoded by an instruction decoder 156 to produce decoded information which is in turn supplied to an execution unit 158. The execution unit 158 includes a microprogram memory 1585 and a microprogram pointer 1584 for accessing the memory 1585. The microprogram pointer 1584 is set with a microaddress contained in the decoded instruction, so that a string of microinstructions corresponding to the instruction in IR 155 is read out of the microprogram memory 1585 and then executed. The execution unit 158 further includes an arithmetic and logic unit (ALU) 1581, a program status word (PSW) 1582 for temporarily storing an execution state of ALU 1581 and a set of temporary registers 1583. The string of microinstructions are executed by means of ALU 1581, PSW 1582, the registers 1583 and a set of general purpose registers 157 to achieve the function designated by the instruction in IR 155. In the course of execution of microinstructions, the execution unit 158 generates a set of sequence control signals 159.

The microprogram memory 1585 stores a macro service microprogram 1586 in accordance with the present embodiment, which be described later in detail. The macro service microprogram 1586 is initiated when the interrupt processing request from INTC 30 designates a macro service request.

Specifically, INTC 30 include a flag 33 for designating the interrupt request from DMAC 20 to be handled as the macro service or as a normal vector interrupt. The set state of the flag 33 designates the macro service, whereas the reset state thereof designates the vector interrupt. When INTC 30 receives the interrupt request, it generates the interrupt processing request 31 to the execution unit 158-1 together with setting interrupt mode information 32-1 into IR 55. The content of the information 32-1 depends on the state of flag 33. INTC 30 further supplies vector number information 32-2 to the execution unit 158. The interrupt mode information 32-1 is decoded to detect which mode is designated. When the information 32-1 designates the vector interrupt, the execution unit 158 saves the contents of PC 151, PSW 1582 and the general purpose register 157 and then obtains the leading address of an interrupt program routine from the vector number information 32-2, the leading address being in turn loaded to PC 151. The interrupt program routine is thereby initiated. On the other hand, when the interrupt mode information 32-1 designates the macro service, the leading address of the macro service microprogram 1582 is derived from the vector number information 32-2 and then set into the pointer 1584. The macro service microprogram is thereby initiated. At this time, the contents of PC 151, PSW 1582 and the registers 157 are not saved, but held therein as they are. Moreover, those contents are inhibited from being updated or changed.

In operation, similarly to CPU 10 shown in FIG. 1, CPU 15 executes an initializing program stored in the program memory 110 to set necessary data and information into the data memory 120, the serial data receiving unit 40 and DMAC 20. In this embodiment, however, DMA control/status information further contains vector interrupt enable/disable information indicating whether or not CPU 15 is shifted into the vector interrupt processing operation immediately after completion of the macro service operation. In the present description, each of DMA control/status information in 1st to (N−1)th block control data area contains the continuous transfer enable information and the vector interrupt disable information, whereas that in Nth block control data area contains the continuous transfer disable information and the vector interrupt enable information. In addition, the flag 33 in INTC 30 is brought into the set state in the initializing program. Thereafter, CPU 15 continues to execute a program stored in the program memory 110.

On the other hand, DMAC 20 operates in accordance with the flow chart shown in FIG. 2, so that each received data consisting of predetermined bits of data is transferred from the unit 40 to 1st block 122 of the memory 120. When the content of the transfer time information in the current register block 202 becomes zero or when EOF code is received, the transfer time information and control/status information in the current register block 202 are saved into the save register block 204 and the contents of the next register block 203 are then copied into the current register block 202 (see steps 259 to 261 in FIG. 2). The peripheral save command signal 24 and the interrupt request signal 23 are thereafter generated.

Figure 6:
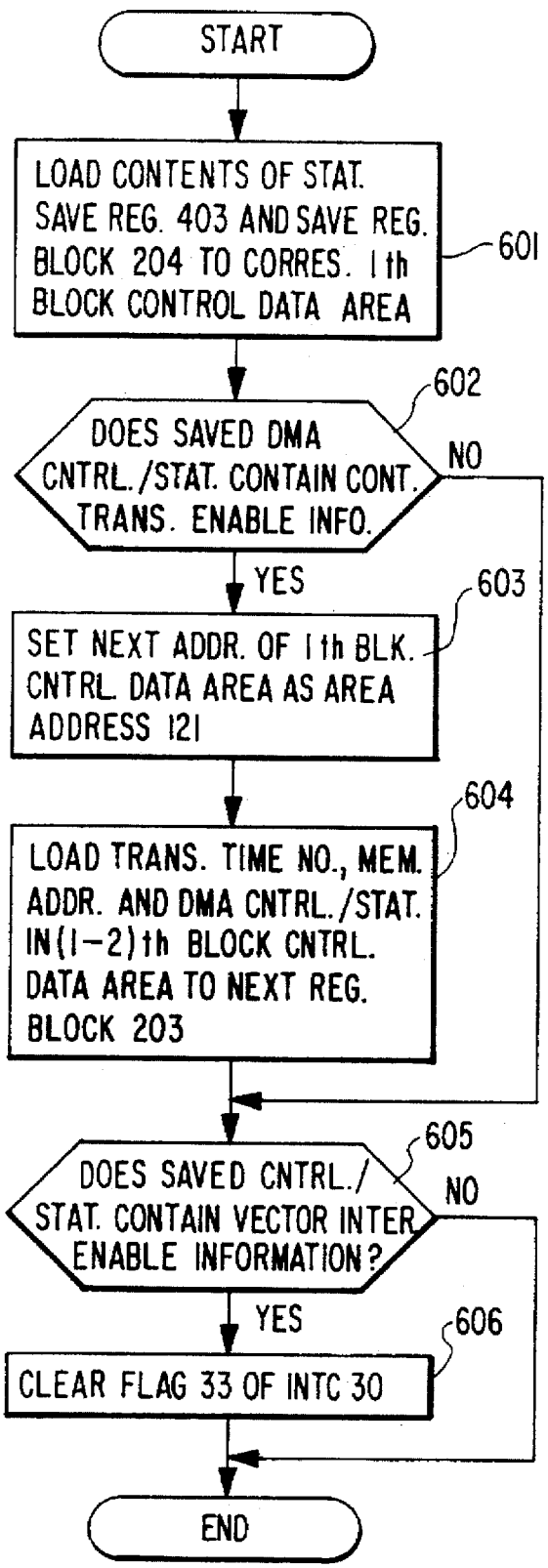
FIG. 6 is a flow chart representative of a macro service microprogram executed by CPU shown in FIG. 5.

Since the flag 33 is in the set state, INTC 30 feeds the macro service mode information 32-1 to IR 55. Thus, the macro service microprogram shown in FIG. 6 is initiated without saving the contents of PC 151, PSW 1582 and the registers 157 and with holding them as they are. In the macro service operation, the contents of the status save register 403 and the save register block 204 are loaded into the corresponding locations of 1st block control data area 123 by use of the address stored in the control data address area 121 (601). Thereafter, it is judged whether or not the saved DMA control/status data contains the continuous transfer enable information (602). In the present description, since the continuous transfer enable information is contained, the next address data in 1st block control data area 123 is set as the area address 121 (603), and the transfer time information, memory address information and DMA control/status information stored in 3rd block control data area are loaded into the next register block 203 of DMAC 20 by use of the new area address 121 and the next address data in 2nd block control data area 125 (604). Subsequently, it is judged whether or not the saved DMA control/status information loaded in 1st area 123 contains the vector interrupt enable information (605). In this description, since the vector interrupt disable information is contained, the macro service operation is terminated.

In response to completion of the macro service operation, PC 151, PSW 1582 and the registers 157 are allowed to change the contents thereof, so that the sespended program execution is resumed. Since CPU 15 does not require the overhead operation, the execution efficiency of CPU 15 is enhanced.

In the macro service operation responsive to the interrupt request generated by the completion of data transfer between the receiving unit 40 and Nth block 126 of the memory 120, the operation of CPU 15 shifts from step 602 to step 605 because the continuous transfer disable information is contained. In step 605, since the vector interrupt enable information is contained, the flag 33 is cleared to the reset state (606). The macro service operation is then terminated.

In response to the flag 33 being cleared, INTC 30 sets the vector interrupt mode information 32-1 into IR 155, so that an interrupt program routine stored in the program memory 110 and written by a user is initiated. In this interrupt routine, the error check operation and the processing operation on the received data are performed.

As described above, since the desired data loading operation between the data memory 120 and DMAC 20 is performed by the macro service microprogram as a part of hardware of the microcomputer, the data processing efficiency is further enhanced and user's burden of making a program is reduced.

Also in the present embodiment, DMAC 20 can perform data transfer between the unit 40 and a local memory, similarly to FIG. 4.

It is apparent that the present invention is not limited to the above embodiments, but may be changed and modified without departing from the scope and spirit of the invention. For example, in place of copying the contents of the next register block 203 into the current register block 202, the transfer control unit 201 may change a register block to be referred between the register blocks 202 and 203 by means of a multiplexer.

What is claimed is:

1. A microprocessor comprising a CPU and a DMA controller for performing a data transfer between a peripheral unit and a memory in response to a transfer request from said peripheral unit, said DMA controller including first storage means for storing first information necessary to perform a first DMA data transfer operation between said peripheral unit and said memory, second storage means for storing second information necessary for a second DMA data transfer operation between said peripheral unit and said memory, said second DMA data transfer being initiated after completion of said first DMA data transfer operation, execution means responsive to said transfer request for performing said data transfer between said peripheral unit and said memory by use of said first information, and means responsive to a completion of said first DMA data transfer operation for causing said execution means to perform a subsequent data transfer between said peripheral unit and said memory in response to said data request from said peripheral unit by use of said second information and for generating an interrupt request to said CPU, wherein said CPU includes means responsive to said interrupt request for supplying said DMA controller with third information necessary for a third DMA data transfer operation to be initiated after completion of said second DMA data transfer operation before said second DMA data transfer operation is completed so that said execution means of said DMA controller is brought into a condition of performing data transfer by use of said third information when said second DMA data transfer operation is completed, and a program counter for designating an address of an instruction to be executed and a program status word for temporarily storing an execution state and said supplying means of said CPU supplies said third information without saving or changing contents of said program counter and said program status word.

2. A microcomputer comprising CPU and a DMA controller for performing data transfer between a peripheral unit and a memory in response to a data transfer request, said DMA controller including execution means for performing said data transfer, first storage means for storing information used by said execution means to perform said data transfer, a second storage means for storing information used to perform a next data transfer operation, means responsive to completion of the data transfer operation using the information stored in said first storage means for copying the information stored in said second storage means into said first storage means to bring said execution means into a condition of performing a data transfer operation using the information copied into said first storage means.

3. The microprocessor as claimed in claim 2, wherein said CPU includes means responsive to the information of said second storage means being copied into said first storage means for loading said second storage means with information which is used for performing a data transfer operation to be initiated after completion of the data transfer operation using said information copied in said first storage means.

4. A microprocessor comprising a CPU and a DMA controller for performing a data transfer between a peripheral unit and a memory in response to a transfer request from said peripheral unit, said DMA controller including first storage means for storing first information necessary to perform a first DMA data transfer operation between said peripheral unit and said memory, second storage means for storing second information necessary for a second DMA data transfer operation between said peripheral unit and said memory, said second DMA data transfer being initiated after completion of said first DMA data transfer operation, execution means responsive to said transfer request for performing said data transfer between said peripheral unit and said memory by use of said first information, and means responsive to a completion of said first DMA data transfer operation for causing said execution means to perform a subsequent data transfer between said peripheral unit and said memory in response to said data request from said peripheral unit by use of said second information and for generating an interrupt request to said CPU, wherein said first information includes continuous transfer enable/disable and transfer time information, said DMA controller copying the second information into the first storage means when said transfer time becomes zero and said transfer enable/disable information designates a continuous transfer.

5. A microprocessor comprising a CPU and a DMA controller for performing a data transfer between a peripheral unit and a memory in response to a transfer request from said peripheral unit, said DMA controller including first storage means for storing first information necessary to perform a first DMA data transfer operation between said peripheral unit and said memory, second storage means for storing second information necessary for a second DMA data transfer operation between said peripheral unit and said memory, said second DMA data transfer being initiated after completion of said first DMA data transfer operation, execution means responsive to said transfer request for performing said data transfer between said peripheral unit and said memory by use of said first information, and means responsive to a completion of said first DMA data transfer operation for causing said execution means to perform a subsequent data transfer between said peripheral unit and said memory in response to said data request from said peripheral unit by use of said second information and for generating an interrupt request to said CPU, wherein said DMA controller further comprises:

a save register block, said first information including a first transfer time and first control/status information having enable/disable information therein, said DMA controller saving said first transfer time and control/status information in said save register once said transfer time is decremented to zero, and wherein said DMA controller copies said second information into said first storage means when said register contains said enable information.

* * * * *